UNITED STATES PATENT OFFICE.

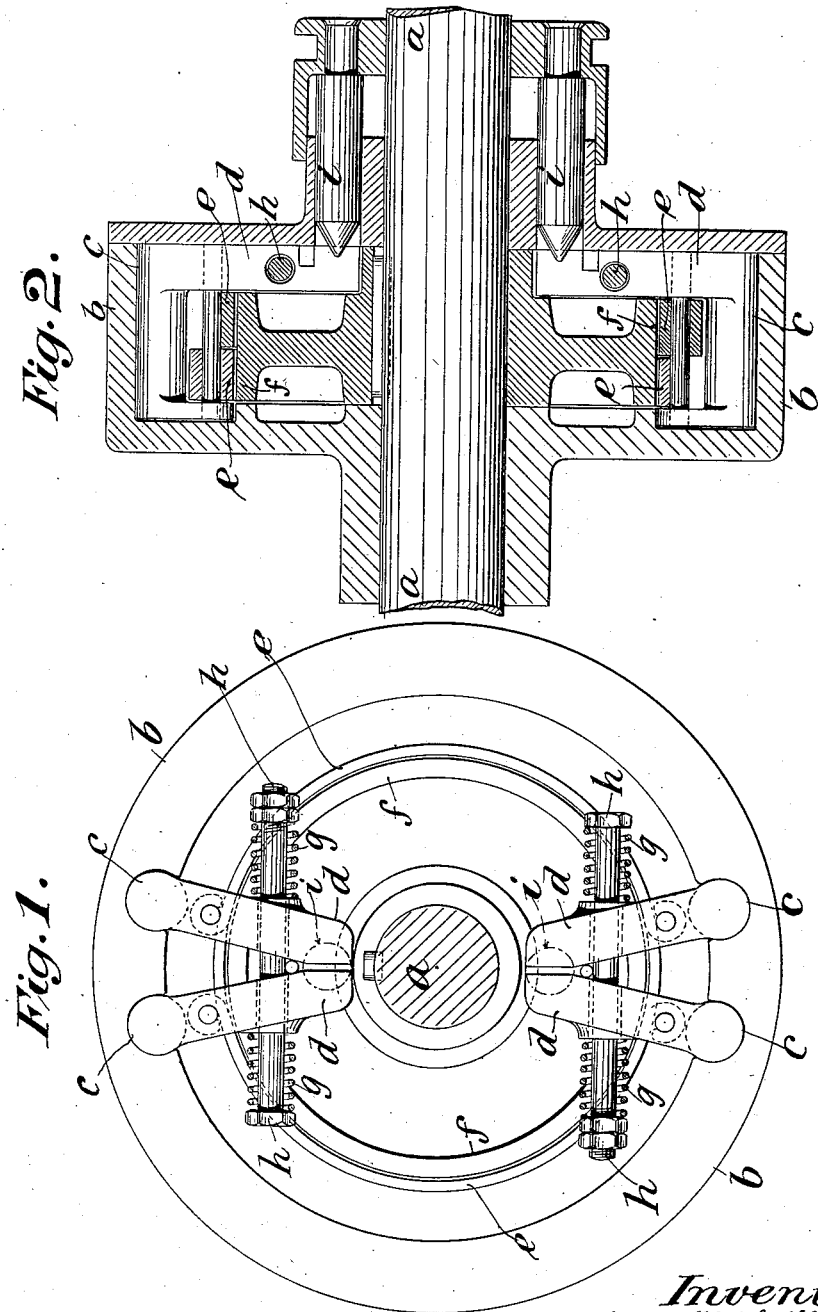

JAMES MITCHELL HEWITT, OF MANCHESTER, AND ARTHUR JAMES DRAKE, OF HALE, ENGLAND, ASSIGNORS TO SAVER CLUTCH CO., LTD., OF MANCHESTER, ENGLAND.

FRICTION-CLUTCH AND THE LIKE.

1,077,831.   Specification of Letters Patent.   Patented Nov. 4, 1913.

Application filed October 14, 1912. Serial No. 725,754.

*To all whom it may concern:*

Be it known that we, JAMES MITCHELL HEWITT and ARTHUR JAMES DRAKE, subjects of the King of Great Britain, and residents of Manchester, in the county of Lancaster, England, and Hale, in the county of Chester, England, respectively, have invented new and useful Improvements in or Applicable to Friction-Clutches and the like, of which the following is a specification.

This invention for improvements in friction clutches which are operated by flexible bands, relates to the mechanism for expanding and contracting the bands.

Toggle levers compressed by drag links or other suitable devices have been used to tighten the bands on the circumference of the drum or pulley, by contracting or shortening the suspended ends of the bands. These various devices for tightening the bands have hitherto given trouble because of the centrifugal force acting on the loose toggles, drag links or other mechanism, and so either loosening or tightening the bands as the speed of revolution increased, thus making the action of the clutch irregular at varying speeds.

The objects of this improvement are:—
To eliminate the centrifugal force by arranging the fulcrums of the band levers at the periphery of the clutch with length of levers toward the shaft center whereas formerly such fulcrums were located near one side with length of levers tangential to the circumference. To reduce the number of parts and simplify the construction of the clutch, by dispensing with toggles and exerting the clutching and declutching force direct on the levers. To avoid shock when the band is taking up its duty by placing the levers under the influence of springs which render the band elastic. To increase the clearance between the flexible band and the drum or pulley when out of gear by the flexible band being positively moved out of engagement by the levers through the solid eyes at each end of the band. To secure a permanent adjustment of the band by placing it under the influence of springs which take up the wear between the friction and clutch drum or pulley. To be able to regulate the exact horse power required from the clutch by so varying the tension of the band springs and consequently the pressure of the band that if the required load is exceeded, the clutch will slip. To lessen the possibility of oil escape by avoiding any holes extending through the periphery in the drum or pulley and fulcruming the levers inside the latter.

According to this invention twin or single levers are suspended in the inner periphery of the clutch body, having their centers in direct diametrical alinement, and their lengths toward the centers of the clutch, the friction bands having free ends which are attached to or in contact with the levers at a convenient center for tightening them on the drums or pulleys, the said friction bands embracing the latter in opposite directions. The before mentioned levers may be operated at their ends near the center of the clutch by cone or wedge shaped longitudinally movable plungers carried in a sliding yoke, these plungers being so constructed that when the yoke is moved backward or forward the levers move and the bands are tightened or loosened on the drums or pulleys by means of springs or positively by the cone or wedge shaped plungers. Single levers may be used with one end of the band fixed or adjustable by means of an adjusting screw on the body of the clutch, one or any number of bands may be used, as will be readily understood without illustration. The said bands may be flexible or otherwise and form an almost complete circle or only a portion or portions thereof.

We attain these objects by the mechanism illustrated in the accompanying drawing, in which—

Figure 1 is a face view of the clutch with cover removed and Fig. 2 a sectional elevation.

Similar letters refer to similar parts throughout the various views.

Referring to the figures generally $a$ is the shaft on which the clutch is mounted, $b$ is the rim of the clutch body suspended from which at the points $c$ are the operating levers $d$ which carry the free ends of the flexible bands $e$ which are tightened on the drum or pulley $f$, secured to the shaft $a$ by means of the springs $g$ the pressure on the springs being regulated by the screw bolt $h$ the pressure on the bands being removed by the wedge or cone shaped longitudinally movable plunger $i$ which forces the levers $d$ apart.

We claim:—

1. In a friction clutch, in combination, a driving member located inside a driven member, twin levers fulcrumed to the said driven member near its periphery and extending toward the center of the clutch, a band encircling the said driving member and with ends pivoted to the said twin levers, a spring device on the said levers for forcing them together and thereby tighten the band around the said driving member and means for forcing the said twin levers apart and thereby releasing the said band.

2. In a friction clutch, in combination, a driving member located inside a driven member, twin levers fulcrumed to the said driven member near its periphery and extending toward the center of the clutch, a band encircling the said driving member and with ends pivoted to the said twin levers, a spring device on the said levers for forcing them together and thereby tighten the band around the said driving member and means for forcing the said twin levers apart and thereby release the said band, the said spring device comprising a screw bolt passing through and springs thereon pressing against the said levers.

3. In a friction clutch, in combination, a driving member located inside a driven member, twin levers fulcrumed to the said driven member near its periphery and extending toward the center of the clutch, a band encircling the said driving member and with ends pivoted to the said twin levers, a spring device on the said levers for forcing them together and thereby tighten the band around the said driving member and means for forcing the said twin levers apart and thereby release the said band, the said means comprising a plunger mounted longitudinally movable in the said driven part and adapted to enter between the free ends of the said twin levers to force them apart.

4. In a friction clutch, in combination, a driving member located inside a driven member, a plurality of twin levers fulcrumed at diametrically opposite points to the said driven part near its periphery and longitudinally displaced in relation to each other, a plurality of bands located side by side around the said driving part with ends pivoted to the said levers respectively, spring devices on the said twin levers for forcing them together and thereby tighten the bands around the said driving member and means on the said driven part for forcing the said levers apart from each other and thereby releasing the said bands.

In testimony whereof we have affixed our signatures in presence of two witnesses.

JAMES MITCHELL HEWITT.
ARTHUR JAMES DRAKE.

Witnesses:
FERDINAND B. BOSSHARDT,
STANLEY E. BRAMALL.

---

Copies of this patent may be obtained for five cents each, by addressing the "Commissioner of Patents, Washington, D. C."